(12) United States Patent
Malton et al.

(10) Patent No.: US 12,271,693 B2
(45) Date of Patent: Apr. 8, 2025

(54) METHOD AND SYSTEM FOR FINDING ASSOCIATIONS BETWEEN NATURAL LANGUAGE AND COMPUTER LANGUAGE

(71) Applicant: BlackBerry Limited, Waterloo (CA)

(72) Inventors: Andrew James Malton, Waterloo (CA); Deeksha Chandola, Toronto (CA); Andrew Eric Walenstein, Issaquah, WA (US); Kundi Yao, Kingston (CA); Gustavo Ansaldi Oliva, Kingston (CA); Ahmed E Hassan, Kingston (CA); Muhammad Asaduzzaman, Thunder Bay (CA)

(73) Assignee: BlackBerry Limited, Waterloo (CA)

( * ) Notice: Subject to any disclaimer, the term of this patent is extended or adjusted under 35 U.S.C. 154(b) by 343 days.

(21) Appl. No.: 17/547,759

(22) Filed: Dec. 10, 2021

(65) Prior Publication Data
US 2023/0186022 A1 Jun. 15, 2023

(51) Int. Cl.
| | |
|---|---|
| *G06F 40/279* | (2020.01) |
| *G06F 16/34* | (2019.01) |
| *G06F 16/36* | (2019.01) |
| *G06F 40/166* | (2020.01) |
| *G06F 40/30* | (2020.01) |
| *G06N 7/01* | (2023.01) |

(52) U.S. Cl.
CPC .......... *G06F 40/279* (2020.01); *G06F 16/345* (2019.01); *G06F 16/36* (2019.01); *G06F 40/166* (2020.01); *G06F 40/30* (2020.01); *G06N 7/01* (2023.01)

(58) Field of Classification Search
CPC ........ G06F 40/00; G06F 40/30; G06F 40/166; G06F 40/279; G06F 16/00; G06F 16/36; G06F 16/345; G06N 7/00; G06N 7/01
See application file for complete search history.

(56) References Cited

U.S. PATENT DOCUMENTS

| | | | |
|---|---|---|---|
| 8,700,997 B1* | 4/2014 | Yang .......................... | G06F 8/33 717/114 |
| 2012/0041953 A1* | 2/2012 | Dumais .................. | G06F 16/353 707/E17.014 |
| 2017/0039188 A1* | 2/2017 | Allen ..................... | G06F 40/263 |
| 2017/0255536 A1* | 9/2017 | Weissinger ......... | G06F 16/9535 |

(Continued)

OTHER PUBLICATIONS

Partachi, P. P., Dash, S. K., Treude, C., & Barr, E. T. (Jun. 2020). POSIT: simultaneously tagging natural and programming languages. In Proceedings of the ACM/IEEE 42nd International Conference on Software Engineering (pp. 1348-1358). (Year: 2020).*

(Continued)

*Primary Examiner* — Daniel C Washburn
*Assistant Examiner* — Sean E Serraguard
(74) *Attorney, Agent, or Firm* — Moffat & Co

(57) ABSTRACT

A method at a computing device including mapping, within a corpus of documents having both natural language terms and computer language terms, each term as a natural language term or a computer language term, thereby creating mapped terms; and applying at least one Latent Dirichlet Allocation (LDA) model to the mapped terms to create topics that correlate the natural language terms and computer language terms.

17 Claims, 5 Drawing Sheets

| | word-1 | word-2 | word-3 | word-4 | ... | word-k |
|---|---|---|---|---|---|---|
| topic-1 | 0.012 | 0.145 | 0.018 | 0.009 | - | 0.062 |
| topic-2 | 0.092 | 0.013 | 0.010 | 0.055 | - | 0.191 |
| topic-3 | 0.011 | 0.123 | 0.021 | 0.075 | - | 0.011 |
| topic-4 | 0.039 | 0.023 | 0.148 | 0.033 | - | 0.096 |
| topic-5 | 0.055 | 0.093 | 0.017 | 0.173 | - | 0.169 |
| ⋮ | - | - | - | - | - | - |
| topic-n | 0.023 | 0.098 | 0.067 | 0.077 | - | 0.059 |

Probability Estimates 220 m-documents 210

(56) References Cited

U.S. PATENT DOCUMENTS

2021/0263953 A1* 8/2021 Suzuki .................. G06Q 10/10

OTHER PUBLICATIONS

Peng, N., Wang, Y., & Dredze, M. (Jun. 2014). Learning polylingual topic models from code-switched social media documents. In Proceedings of the 52nd Annual Meeting of the Association for Computational Linguistics (vol. 2: Short Papers) (pp. 674-679). ( Year: 2014).*
Donnelly, K., & Deuchar, M. (2011). The bangor autoglosser: a multilingual tagger for conversational text. ITA11, Wrexham, Wales, 17-25. (Year: 2011).*
Lind, F., Eberl, J. M., Galyga, S., Heidenreich, T., Boomgaarden, H. G., Jiménez, B. H., & Berganza, R. (2019). A bridge over the language gap: Topic modelling for text analyses across languages for country comparative research. University of Vienna: Working Paper of the Reminder-Project. (Year: 2019).*
L. Ponzanelli, A. Mocci and M. Lanza, "StORMeD: Stack Overflow Ready Made Data," 2015 IEEE/ACM 12th Working Conference on Mining Software Repositories, Florence, Italy, 2015, pp. 474-477, doi: 10.1109/MSR.2015.67. (Year: 2015).*
J. Silva, J. Mexia, A. Coelho and G. Lopes, "Document clustering and cluster topic extraction in multilingual corpora," Proceedings 2001 IEEE International Conference on Data Mining, San Jose, CA, USA, 2001, pp. 513-520, doi: 10.1109/ICDM.2001.989559. (Year: 2001).*
European Patent Application No. 22192323.8, European Search Report, May 12, 2023.
Nguyen Anh Tuan et al., "A topic-based approach for narrowing the search space of buggy files from a bug report", Proceedings of the 23rd International Conference on Supercomputing, ACMPUB27, New York, Nov. 6, 2011, pp. 263-272, XP058933090.
Psarras Christos et al., "A Mechanism for Automatically Summarizing Software Functionality from Source Code", 2019 IEEE 19th International Conference on Software Quality, Reliability and Security (QRS), Jul. 22, 2019, pp. 121-130, XP033623420.
Kapadia, Shashank et al., "Evaluate Topic Models: Latent Dirichlet Allocation (LDA)—A step-by-step guide to building interpretable topic models", Towards Data Science, Aug. 19, 2019, pp. 1-26, XP093044506.
W. Yang, J. Boyd-Graber, P. Resnik, A multilingual topic model for learning weighted topic links across corpora with low comparability, in:Proceedings of the 2019 Conference on Empirical Methods in Natural Language Processing and the 9th International Joint Conference on Natural Language Processing (EMNLP-IJCNLP), Association for Computational Linguistics, Hong Kong, China, 2019, pp. 1243-1248.
S. Hao, J. Boyd-Graber, M. J. Paul, Lessons from the Bible on modern topics: Low-resource multilingual topic model evaluation, in: Proceedings of the 2018 Conference of the North American Chapter of the Association for Computational Linguistics: Human Language Technologies, vol. 129 (Long Papers), Association for Computational Linguistics, New Orleans, Louisiana, 2018, pp. 1090-1100.
G. Balikas, Mining and Learning from Multilingual Text Collections using Topic Models and Word Embeddings, Theses, Grenoble 1 UGA—Universite Grenoble Alpes, 2017.
T.-H. Chen, S. W. Thomas, A. E. Hassan, A survey on the use of topic models when mining software repositories, Empirical Softw. Engg. 21 (2016) 1843-1919.
D. M. Blei, A. Y. Ng, M. I. Jordan, Latent dirichlet allocation, J. Mach. Learn. Res. 3 (2003) 993-1022.
K. Yao, H. Li, W. Shang, A. E. Hassan, A study of the performance of general compressors on log files, Empirical Software Engineering 25 (2020) 3043-3085.
D. Mimno, H. M. Wallach, J. Naradowsky, D. A. Smith, A. McCallum, Polylingual topic models,in: Proceedings of the 2009 Conference on Empirical Methods in Natural Language Processing, Association for Computational Linguistics, Singapore, 2009, pp. 880-889.
Z. Zhu, M. Li, L. Chen, Z. Yang, Building comparable corpora based on bilingual LDA model, in: Proceedings of the 51st Annual Meeting of the Association for Computational Linguistics (vol. 2: Short Papers), Association for Computational Linguistics, Sofia, Bulgaria, 2013, pp. 278-282.
M. Roder, A. Both, A. Hinneburg, Exploring the space of topic coherence measures, in: Proceedings of the Eighth ACM International Conference on Web Search and Data Mining, WSDM '15, Association for Computing Machinery, New York, NY, USA, 2015, p. 399-408.
G. Bouma, Normalized (pointwise) mutual information in collocation extraction, in: From Form to Meaning: Processing Texts Automatically,Proceedings of the Biennial GSCL Conference 2009, vol. Normalized,Tubingen, 2009, pp. 31-40.
D. Newman, J. H. Lau, K. Grieser, T. Baldwin, Automatic evaluation of topic coherence, in: Human Language Technologies: The 2010 Annual Conference of the North American Chapter of the Association for Computational Linguistics, HLT '10, Association for Computational Linguistics, USA, 2010, p. 100-108.
D. Mimno, H. M. Wallach, E. Talley, M. Leenders, A. McCallum, Optimizing semantic coherence in topic models, in: Proceedings of the Conference on Empirical Methods in Natural Language Processing, EMNLP '11, Association for Computational Linguistics, USA, 2011, p. 262-272.
N. Aletras, M. Stevenson, Evaluating topic coherence using distributional semantics, in: Proceedings of the 10th International Conference on Computational Semantics (IWCS 2013)—Long Papers, Association for Computational Linguistics, Potsdam, Germany, 2013, pp. 13-22.
T.-H. Chen, S. W. Thomas, M. Nagappan, A. E. Hassan, Explaining software defects using topic models, in: Proceedings of the 9th IEEE Working Conference on Mining Software Repositories, MSR '12, IEEE Press, 2012, p. 189-198.
A. Barua, S. W. Thomas, A. E. Hassan, What are developers talking about? an analysis of topics and trends in stack overflow, Empirical Softw. Engg. 19 (2014) 619-654.
H. Li, T.-H. P. Chen, W. Shang, A. E. Hassan, Studying software logging using topic models, Empirical Softw. Engg. 23 (2018) 2655-2694.
Z. Wan, X. Xia, A. E. Hassan, What do programmers discuss about blockchain? a case study on the use of balanced Ida and the reference architecture of a domain to capture online discussions about blockchain platforms across stack exchange communities, IEEE Transactions on Software Engineering 47 (2021) 1331-1349.
A. Agrawal, W. Fu, T. Menzies, What is wrong with topic modeling? and how to fix it using search-based software engineering, Information and Software Technology 98 (2018) 74-88.
A. Panichella, B. Dit, R. Oliveto, M. Di Penta, D. Poshyvanyk, A. De Lucia, How to effectively use topic models for software engineering tasks? an approach based on genetic algorithms, in: Proceedings of the 2013 International Conference on Software Engineering, ICSE '13, IEEE Press, 2013, p. 522-531.
J. Ansel, S. Kamil, K. Veeramachaneni, J. Ragan-Kelley, J. Bosboom, U.M. O'Reilly, S. Amarasinghe, Opentuner: An extensible framework for program autotuning, in: Proceedings of the 23rd International Conference on Parallel Architectures and Compilation, PACT '14, Association for Computing Machinery, New York, NY, USA, 2014, p. 303-316.
P. Fung, A statistical view on bilingual lexicon extraction: From parallel corpora to non-parallel corpora, in: Proceedings of the Third Conference of the Association for Machine Translation in the Americas on Machine Translation and the Information Soup, AMTA '98, Springer-Verlag, Berlin, Heidelberg, 1998, p. 1-17.
J. Boyd-Graber, D. M. Blei, Multilingual topic models for unaligned text, in: Proceedings of the Twenty-Fifth Conference on Uncertainty in Artificial Intelligence, UAI '09, AUAI Press, Arlington, Virginia, USA, 2009, p. 75-82.
J. Jagarlamudi, H. Daume, Extracting multilingual topics from unaligned comparable corpora, in: C. Gurrin, Y. He, G. Kazai, U. Kruschwitz, S. Little, T. Roelleke, S. Ruger, K. van Rijsbergen

(56) References Cited

OTHER PUBLICATIONS (Eds.), Advances in Information Retrieval, Springer Berlin Heidelberg, Berlin, Heidelberg, 2010, pp. 444-456.

Y. Hu, K. Zhai, V. Eidelman, J. Boyd-Graber, Polylingual tree-based topic models for translation domain adaptation, in: Proceedings of the 52nd Annual Meeting of the Association for Computational Linguistics (vol. 1: Long Papers), Association for Computational Linguistics, Baltimore,Maryland, 2014, pp. 1166-1176.

M. Yuan, B. Van Durme, J. L. Ying, Multilingual anchoring: Interactive topic modeling and alignment across languages, in: S. Bengio, H. Wallach, H. Larochelle, K. Grauman, N. Cesa-Bianchi, R. Garnett (Eds.), Advances in Neural Information Processing Systems, vol. 31, Curran Associates,Inc., 2018.

Y. Hu, J. Boyd-Graber, Efficient tree-based topic modeling, in: Proceedings of the 50th Annual Meeting of the Association for Computational Linguistics: Short Papers—vol. 2, ACL '12, Association for Computational Linguistics, USA, 2012, p. 275-279.

S. Arora, R. Ge, A. Moitra, Learning topic models—going beyond svd, in:2013 IEEE 54th Annual Symposium on Foundations of Computer Science, IEEE Computer Society, Los Alamitos, CA, USA, 2012, pp. 1-10.

T. Landauer, P. Foltz, D. Laham, An introduction to latent semantic analysis, Discourse processes 25 (1998) 259-284.

B. Shi, W. Lam, L. Bing, Y. Xu, Detecting common discussion topics across culture from news reader comments, in: Proceedings of the 54th Annual Meeting of the Association for Computational Linguistics (vol. 1: Long Papers), Association for Computational Linguistics, Berlin, Germany, 2016,pp. 676-685.

M. Johnson, S. Riezler, Exploiting auxiliary distributions in stochastic unification-based grammars, in: Proceedings of the 1st North American Chapter of the Association for Computational Linguistics Conference, NAACL 2000, Association for Computational Linguistics, USA, 2000, p. 154-161.

J. H. Gennari, P. Langley, D. Fisher, Models of incremental concept formation, Artificial Intelligence 40 (1989) 11-61.

R. Storn, K. Price, Differential evolution—a simple and efficient heuristic for global optimization over continuous spaces, Journal of Global Optimization 11 (1997) 341-359.

C. Treude, M. Wagner, Predicting good configurations for github and stack overflow topic models, in: Proceedings of the 16th International Conference on Mining Software Repositories, MSR '19, IEEE Press, 2019, p. 84-95.

M. Lopez-Ibanez, J. Dubois-Lacoste, L. Perez Caceres, M. Birattari, T. Stutzle, The irace package: Iterated racing for automatic algorithm configuration, Operations Research Perspectives 3 (2016) 43-58.

H. M. Wallach, I. Murray, R. Salakhutdinov, D. Mimno, Evaluation methods for topic models, in: Proceedings of the 26th Annual International Conference on Machine Learning, ICML '09, Association for Computing Machinery, New York, NY, USA, 2009, p. 1105-1112.

J. Chang, J. Boyd-Graber, S. Gerrish, C. Wang, D. M. Blei, Reading tea leaves: How humans interpret topic models, in: Proceedings of the 22nd International Conference on Neural Information Processing Systems,NIPS'09, Curran Associates Inc., Red Hook, NY, USA, 2009, p. 288-296.

K. Stevens, P. Kegelmeyer, D. Andrzejewski, D. Buttler, Exploring topic coherence over many models and many topics, in: Proceedings of the 2012 Joint Conference on Empirical Methods in Natural Language Processing and Computational Natural Language Learning, EMNLP-CoNLL '12, Association for Computational Linguistics, USA, 2012, p. 952-961.

L. Layman, A. P. Nikora, J. Meek, T. Menzies, Topic modeling of nasa space system problem reports: Research in practice, in: Proceedings of the 13th International Conference on Mining Software Repositories, MSR805'16, Association for Computing Machinery, New York, NY, USA, 2016, p. 303-314.

T.-H. P. Chen, S. W. Thomas, H. Hemmati, M. Nagappan, A. E. Hassan,An empirical study on the effect of testing on code quality using topic models: A case study on software development systems, IEEE Transactions on Reliability 66 (2017) 806-824.

K. W. Church, P. Hanks, Word association norms, mutual information, and lexicography, Computational Linguistics 16 (1990) 22-29.

\* cited by examiner

METHOD AND SYSTEM FOR FINDING ASSOCIATIONS BETWEEN NATURAL LANGUAGE AND COMPUTER LANGUAGE

FIELD OF THE DISCLOSURE

The present disclosure relates to natural language processing, and in particular relates to processing of a corpus of documents having both natural language elements and computer language elements.

BACKGROUND

In Natural Language Processing (NLP), documents can be classified by finding specific sets of words in the document, and based on the sets of words found, the type of document may be identified. This is sometimes referred to as topic modelling, where the term 'topic' represents a set of words. In topic modeling, a model may be trained to automatically discover topics appearing in documents.

Latent Dirichlet Allocation (LDA) is one example of a topic modelling technique. This technique assumes that the distribution of topics in a document and the distribution of words in a topic are both Dirichlet distributions. LDA assigns words to topics, and if the collection of documents is sufficiently large, LDA may discover topics based on the co-occurrence of individual terms/words.

LDA has been shown to provide good results when a single language appears in the documents, or where various natural languages are in the corpus of documents, but where the documents are translations of each other. However, certain corpuses may contain other information which may not be effectively modelled using LDA. For example, technology blogs, programming groups, computer help sites, among others, may contain both computer language such as source code, log data, and the like, mixed with natural language elements. Current LDA techniques do not provide good associations between such computer language terms and natural language terms.

BRIEF DESCRIPTION OF THE DRAWINGS

The present disclosure will be better understood with reference to the drawings, in which.

DETAILED DESCRIPTION OF THE DRAWINGS

Figure 1:
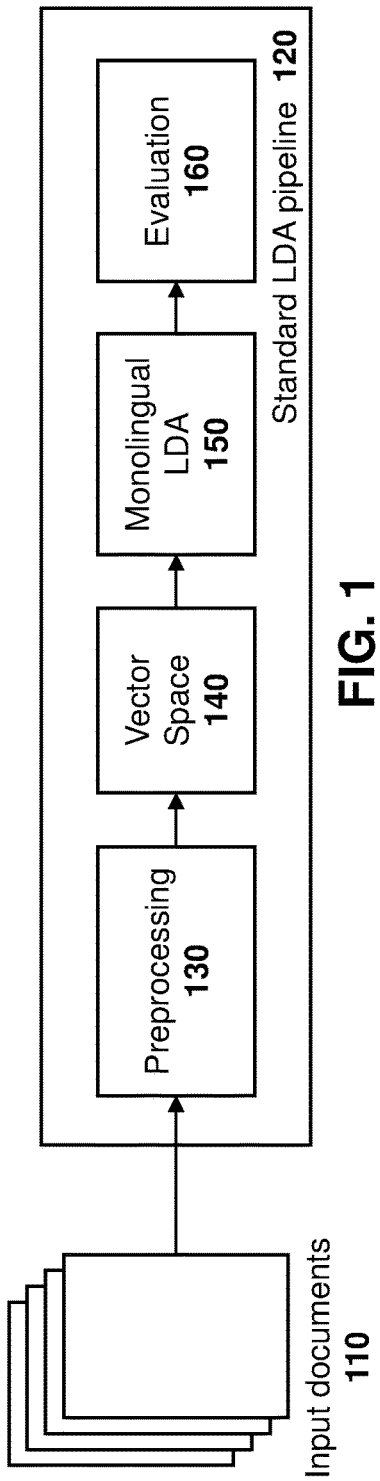
FIG. 1 is a block diagram showing an example LDA pipeline.

The present disclosure provides a method at a computing device comprising: mapping, within a corpus of documents having both natural language terms and computer language terms, each term as a natural language term or a computer language term, thereby creating mapped terms; and applying at least one Latent Dirichlet Allocation (LDA) model to the mapped terms to create topics that correlate the natural language terms and computer language terms.

The present disclosure further provides a computing device comprising: a processor; and a communications subsystem, wherein the computing device is configured to: map, within a corpus of documents having both natural language terms and computer language terms, each term as a natural language term or a computer language term, thereby creating mapped terms; and apply at least one Latent Dirichlet Allocation (LDA) model to the mapped terms to create topics that correlate the natural language terms and computer language terms.

The present disclosure further provides a computer-readable medium for storing instruction code, which, when executed by a processor of a computing device cause the computing device to: map, within a corpus of documents having both natural language terms and computer language terms, each term as a natural language term or a computer language term, thereby creating mapped terms; and apply at least one Latent Dirichlet Allocation (LDA) model to the mapped terms to create topics that correlate the natural language terms and computer language terms.

Computer language is often used with natural language in documents pertaining to computer issues. For example, software logs are a valuable resource in the diagnosis of failures in software systems. When end users describe software failures, often they may combine natural language such as English with computer logs. Examples of channels in which end users describe technical problems with a combination of natural language and logs may include tickets in information technology (IT) ticket systems; online chat with customer technical support; posts in technical support forums; among others.

Further, computer language is not limited to logs and in some cases could include source code, error screen or error message information, among other options. Logs are used as a source of computer language within documents such as support threads in the examples below merely for illustration, and other forms of computer language could equally be used.

Thus, the term "computer language" as used herein refers to program-generated text that relates to operating or debugging a computer, including source code and log entries, among other options. For example, such computer language may include output from a log, an error report generated by a computer, a screen dump, or other similar program or computer generated output.

Latent associations may exist between pieces of text written in natural language and certain log excerpts in support thread datasets. Associations may be based on an original post in which a user may describe a problem, or in a subsequent post in response to a request for the log excerpts. For example, there may be multiple reports of a specific operating system crash that is associated with the log excerpt "VIDEO.TDR.FAILURE (igdkmd64.sys)". Discovering such latent associations enables the construction of a knowledge base that links problem discussions to log excerpts that are typically associated with these discussions.

Ultimately, such a knowledge base speeds up failure debugging and technical support service quality.

Therefore, in accordance with the embodiments of the present disclosure, systems and methods are provided to address how to find associations between natural language and computer language.

In one embodiment, the problem of establishing connections between natural language terms and computer language terms such as text within logs can be seen as a problem of establishing connections between pieces of texts that are written in different languages. More specifically, computer language such as system logs may be produced by a given tool and can therefore be seen as a semi-informal language that has its own syntax, vocabulary and semantics.

LDA is typically used on a corpus of documents which is monolingual. As used herein, a corpus of documents is a collection of documents, where each document is a collection of words/terms. As used herein, a "term" may consist of one word or a group of words.

Figure 2:
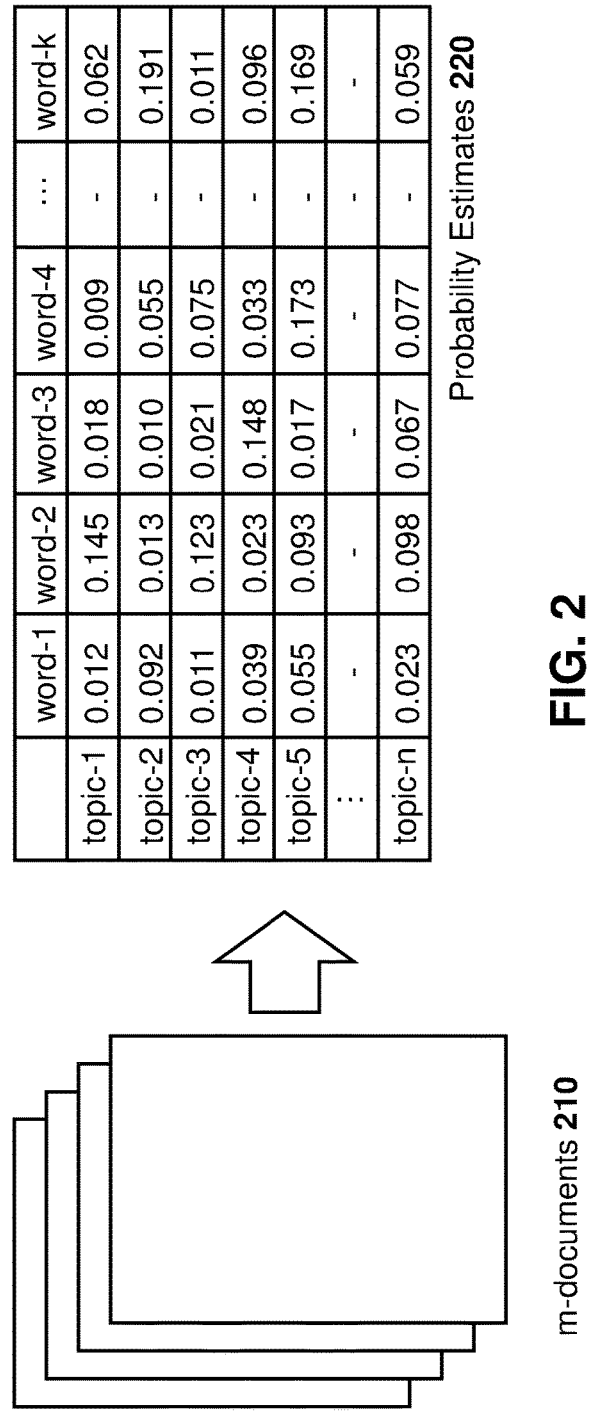
FIG. 2 is a block diagram showing topic tuples assigned to a topic based on word probability estimates.

Reference is now made to FIG. 1. The example of FIG. 1 shows a typical LDA structure in which a corpus of input documents 110 is provided to a standard LDA pipeline 120. In some embodiments, the corpus of input documents 110 may be chosen based on various criteria. For example, in the embodiments of FIGS. 2 to 4 described below, the criteria may include a requirement that log entries and natural language text exist together. However, for the purpose of FIG. 1, the selection of the corpus of input documents 110 can be done based on any factors or criteria.

Each document is provided to the standard LDA pipeline 120. The text of each document may then be subjected to preprocessing at block 130. Preprocessing may include tokenization, lemmatization, stemming, and removal of stopwords, among other preprocessing steps. Thus, at block 130 the preprocessing may make any pluralized words singular; convert any verb to the present tense; remove certain words such as "the", "a", "and", among others; words in the third person may be changed to the first person; all words may be converted to lowercase; punctuation may be removed; words may be reduced to their root form; very common words may be pruned; hypertext markup language (html) tags may be removed; special characters may be removed; among other options for preprocessing.

The preprocessed dictionary may then be provided to a vector space block 140. Vector space block 140 may create vectors for various topics. For example, referring to FIG. 2, a plurality of documents 210 can be provided through the LDA model and thereafter each topic is represented by a tuple of words, where each word has a probability estimate 220. The probability estimates for each topic would add to 1 typically, and could indicate the most prevalent words for such topic.

Referring again to FIG. 1, from the vector space block 140, the process proceeds to block 150 in which a monolingual LDA may be applied to each document. In particular, each document is represented by a certain number of topics, as determined by block 150. The topics for each document may be chosen based on the prevalence of words/terms in the document and the associated prevalence of such words/terms in the topic. In some cases, a defined number of topics may be chosen for each document.

The process then proceeds to block 160 in which an evaluation of the LDA model may be made. The evaluation may be based on one or more criteria to see how well the model classifies documents.

Based on FIG. 1, a corpus of documents in a single language can therefore be processed using an LDA model. However, the model of FIG. 1 is not well suited for documents which have both natural language and computer language. For example, the English word "error" and the computer language term "error" may mean different things and therefore, the processing of the logs and the English language text together may produce erroneous results.

In this regard, three embodiments are described below. In a first embodiment, a prefix may be added to words in the document to distinguish between natural language in computer language. In a second embodiment, natural language text can be split from computer language text, and each can be processed by an LDA model. The results can be combined, and the combined results can then be further processed by another LDA model. In a third embodiment, a multilingual LDA model that is adapted to utilize a corpus of documents which are translations of each other, can be enhanced to operate with computer language and natural language. Each are described below.

Tagging Words

Standard LDA models are monolingual, which means that they cannot align topics across languages. In some cases, standard LDA models can still produce topics containing words for multiple languages if run on multiple input documents. Such multilingual topics can uncover relationships between words from different languages. However, in cases where there are natural language and computer language terms that are loosely associated, the standard LDA models do not produce good results.

Therefore, in one embodiment of the present disclosure, a prefix may be added to words/terms in the original documents, such that natural language text and computer language text can be differentiated.

Figure 3:
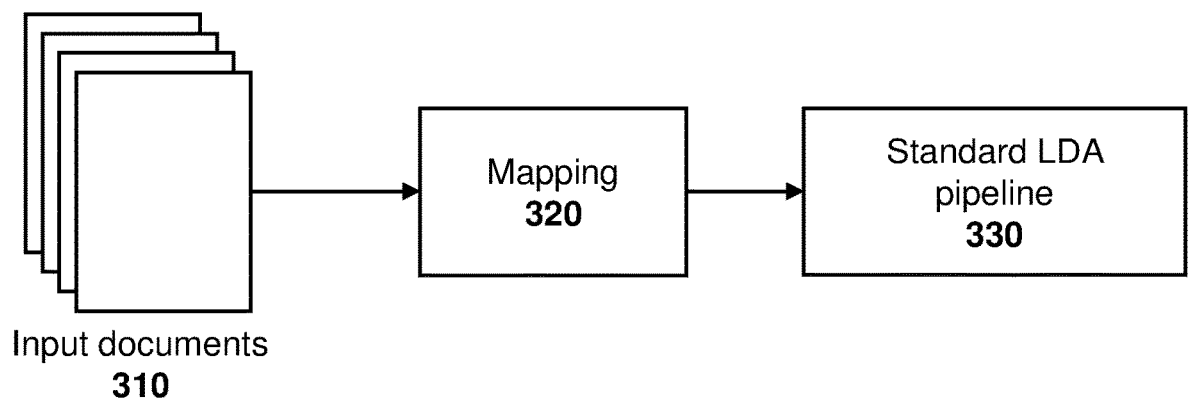
FIG. 3 is a block diagram of one embodiment of the present disclosure in which natural language terms and computer language terms are mapped and a prefix is added to each term prior to inputting the terms to an LDA pipeline.

Reference is now made to FIG. 3. In the embodiment of FIG. 3, input documents 310 comprise a corpus of documents for which natural and computer language processing is needed.

For example, in one case the documents may be sourced from a forum such as a community question-answer forum. Such forum may, for example, be organized into various sections and subsections such as operating system support sections which may include operating system crashes in one subsection and other issues with the operating system in other subsections.

In such forum, users may ask technical questions by starting a thread on a given forum subsection. Any user can respond to a question by providing one or more replies. In a reply, form members typically asked for question clarifications, suggest that the original poster run diagnostic software tools, examine the logs produced by the diagnostic software tools, and offer potential solutions to the problem. Thus, a post may be either a question or a reply to the question. A thread may contain natural language text such as English text and may further contain computer language text such as system logs. However, in some cases, the post may not contain any system logs.

In some embodiments, it may be beneficial to limit input documents to a single type of computer language. Specifically, various diagnostic tools, logs, source code, among others, may be found in different threads, and each may be considered to be a different language. For example, logs produced by each log tool may differ in terms of structure, vocabulary and grammar. Therefore, each log tool may produce logs in a different language and the embodiments of the present disclosure may, in some cases, choose threads or posts which have the same log structure and semantics to be part of a corpus of documents in order to create the topics for the documents within that corpus of documents.

In the embodiments of the present disclosure, the systems and methods uncover associations between natural language terms and computer language terms, and therefore utilizing the same computer language between posts may be beneficial to create such associations.

However, in some cases logs or other computer language text from different sources may be considered to be similar enough to combine in a single corpus of documents.

In other cases, other criteria may be applied to create the corpus of documents. For example, in some cases each document in the corpus of documents may be required to have both computer language terms and natural language terms.

In some cases, documents that are monolingual, and have only one of the natural language terms or computer language terms, may be included. For example, this may occur based on the location of the documents within certain sections of computer help websites in some cases.

In other cases, other filters may be applied to create the corpus of documents forming input documents 310.

Other options are possible for the input documents 310.

In the embodiment of FIG. 3, the input documents 310 are provided to a mapping function 320. Mapping function 320 may be used to separate natural language terms from computer language terms. This may be done in a variety of ways.

In one example, regular expressions may be used to detect the presence of boundaries of logs in a thread. For example, a logging tool may have standardized text at the beginning of a log that can be used as a differentiating factor between in the text and logs. In this case, the mapping function may map the words/terms before the log boundary as natural language text and the words/terms after the boundary as computer language text.

Similarly, in some cases a boundary may exist at the end of a system log, and the mapping function 320 may map words/terms before the ending boundary (but after the beginning boundary) as computer language terms and words/terms after the ending boundary as natural language terms.

For example, a tool such as MiniToolBox™ by Farbar may create logs that start with "MiniToolBox by Farbar Version: 18-01-2012, Ran by **** on Apr. 4, 2020 at 04:10:55" and this could be used as the beginning boundary. In other cases, only sections of the log files may be used, and may contain headers such as "====================== FF Proxy Settings: ==========================", or the like. The end boundary may be similarly be distinctive text based on the logging program.

In other cases, a dictionary of terms which can be found in the computer log could be created to allow mapping function 320 to distinguish between natural language text and computer language text. In some cases the context of the word may be analyzed in cases were a computer language term and a natural language term could be the same.

Other options are possible.

Once the terms are distinguished, mapping function 320 may add a prefix such as "text_" before any natural language word/term and "log_" before any computer language word/term. Thus, the enriched LDA model of FIG. 3 performs a pre-emptive data preprocessing step before pushing the input documents to the standard LDA pipeline. Each text word is prefixed and as a result, the standard LDA pipeline produces topics containing words that explicitly indicate the language in which they are written.

The output from mapping function 320 may then be provided to a standard LDA model 330. The functionality from, for example, standard LDA pipeline 120 of FIG. 1 may then be used. However, in this case, the words include a prefix depending on whether the word is from natural language or computer language.

Thus, in some cases, preprocessing may occur on the words from the mapping function 320. In some embodiments, the preprocessing may be done on all words from the mapping function 320. In some cases, the preprocessing may only occur on natural language words and no preprocessing would occur for the computer language words.

In some embodiments, some preprocessing, such as tokenization, lemmatization, stemming, and removal of stopwords could occur prior to adding the prefix at the mapping function 320. In some embodiments, the preprocessing, such as tokenization, lemmatization, stemming, and removal of stopwords could occur at the LDA model 330, where the LDA model 330 is configured to consider portions after the prefix for such preprocessing. Again, the LDA model 330 could ignore any terms having a computer language prefix in some cases.

Therefore, the embodiment of FIG. 3 allows for the processing of multilingual documents, where part of the document is natural language text and part of the document is computer language text. Most cases previous to the present embodiment of FIG. 3 include no explicit indication of the language in which the topic word is written in. Thus, the enriched LDA model of the embodiment of FIG. 3 addresses such drawback.

The embodiment of FIG. 3 is simple and straightforward to interpret and topics in such model tend to be coherent and represent themes.

Two Layer LDA

Figure 4:
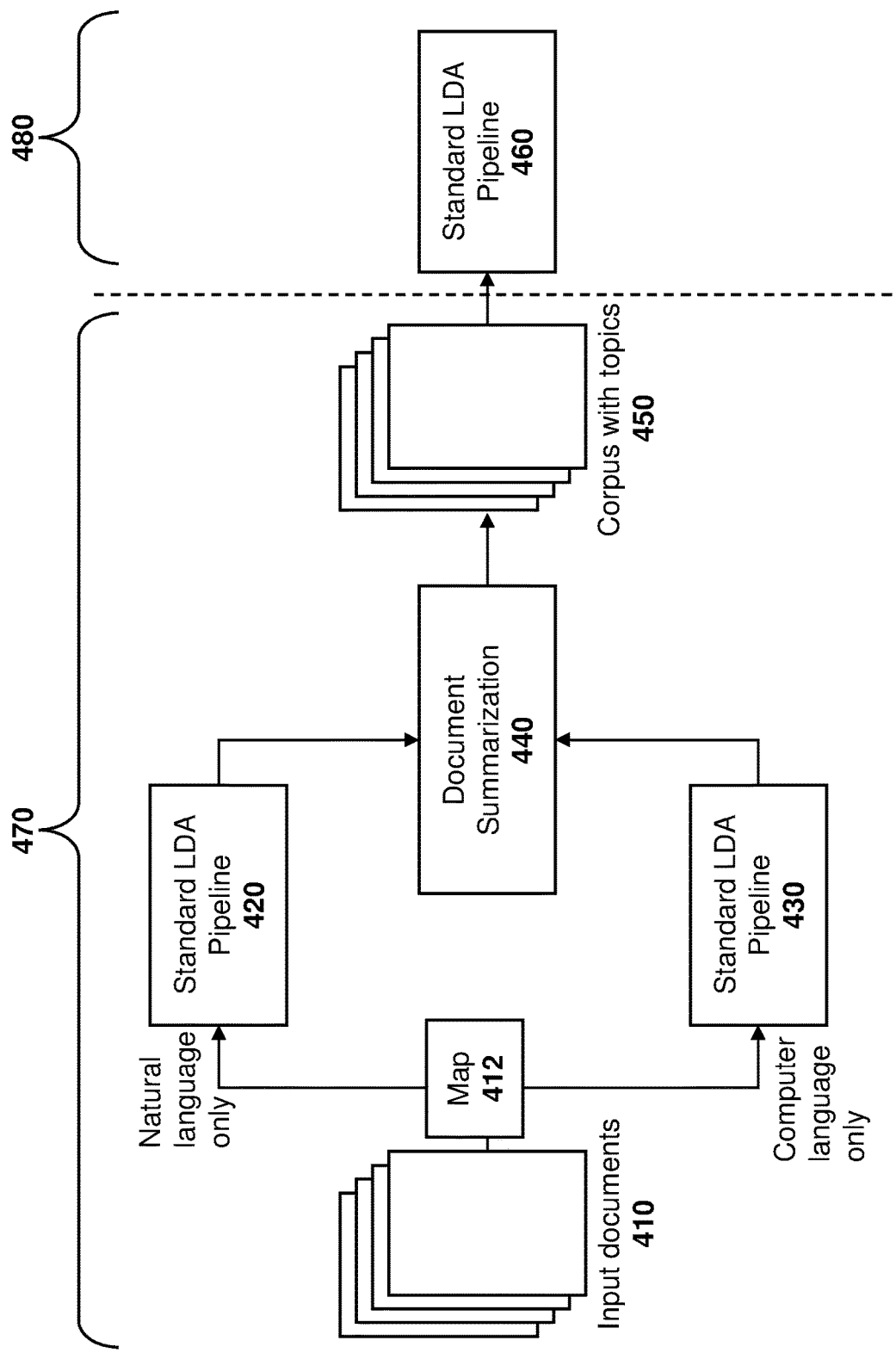
FIG. 4 is a block diagram showing a two stage process for processing a corpus of documents, where a first stage applies separate LDA models to computer language terms than natural language terms from a corpus of documents and where the outputs are then combined and supplied to a third LDA model.

In some cases, the embodiment of FIG. 3 may be biased toward producing topics that frequently include text words only, when text is more prevalent than logs. Indeed, logs tend to be repetitive and contain a much lower number of unique words compared to text. In this regard, in another embodiment a two layer LDA model is provided. Reference is now made to FIG. 4.

In the embodiment of FIG. 4, input documents 410 may be similar to input documents 310 from the embodiment of FIG. 3. Specifically, the input documents may be selected based on various criteria including log files or computer language text being in the same format or utilizing the same tools in some cases.

The words/terms within the corpus of input documents 410 could be distinguished between computer language text and natural language text. This may be done, for example, by using a mapping function 412, which may be similar to mapping function 320 from the embodiment of FIG. 3. In other cases, the prefix may not be added and the words within the corpus of input documents 410 may simply be sorted.

Next, two topic models are used. A first is for natural language text only and a second is for computer language text only. Specifically, as seen in FIG. 4, natural language text is provided to standard LDA pipeline 420, whereas computer language text is provided to standard LDA pipeline 430.

The processing at standard LDA pipeline 420 and the processing at standard LDA pipeline 430 may be similar to the processing performed in the embodiment of FIG. 1.

The output from the standard LDA pipeline 420 and the output from standard LDA pipeline 430 are then provided to a document summarization block 440. At block 440 the contents of the original document are replaced with the natural language topics and the computer language topics. More specifically, for each topic model, a document specific topic is first identified according to topic probabilities.

The top number of terms by term probability may then be extracted (for example for display or mnemonic purposes). Extraction may, however, in some cases not occur and the complete set of terms may be used. If extraction occurs, the actual number of terms may be chosen based on design considerations and may in some cases be fixed. For example, the top ten terms may be extracted in some cases. However, the embodiments of the present disclosure are not limited to extracting ten terms, and a fewer or a greater number of terms could be extracted in some cases. Further, in some cases the number of terms extracted may be variable based on factors within the system.

Further, to identify the origin of each term, topic indexes may be appended at the end of each term in some embodiments. For example, a term may be composed as "LOG: stamp:TOPIC:399". This term indicates that the word "stamp" comes from a log file and is associated with topic 399.

At the document summarization block 440, the top terms extracted from both from LDA pipeline 420 and LDA pipeline 430 are then merged by document, creating a corpus with topics 450. In some cases, corpus with topics 450 has the same corpus structure as input documents 410, but has topics added to such structure.

Corpus with topics 450 may now act as an input to a third LDA topic model, namely standard LDA pipeline 460.

The output from LDA pipeline 460 provides correlated topics for the original input documents.

Based on this, two layers in the model of FIG. 4 are provided. Specifically, a preprocessing layer 470 breaks the input documents into natural language and computer language components, runs each through a standard LDA pipeline, and then merges the documents with topics to create a corpus of documents having topics embedded therein.

A second layer 480 processes the corpus of documents having topics embedded therein to produce correlated topics for the original input documents.

Therefore, the embodiment of FIG. 4 provides a design which may counterbalance the prevalence of natural language words in a corpus of documents.

Bilingual LDA

Multilingual LDA models are designed to find topic alignments across documents written in different languages. However, such multilingual models are generally a directed to documents that are direct translations of one another.

In the context of documents having both natural language and computer language elements, the computer language elements are often loosely related to the natural language components, as opposed to being direct translations, and thus the multilingual model may be unsuitable.

Figure 5:
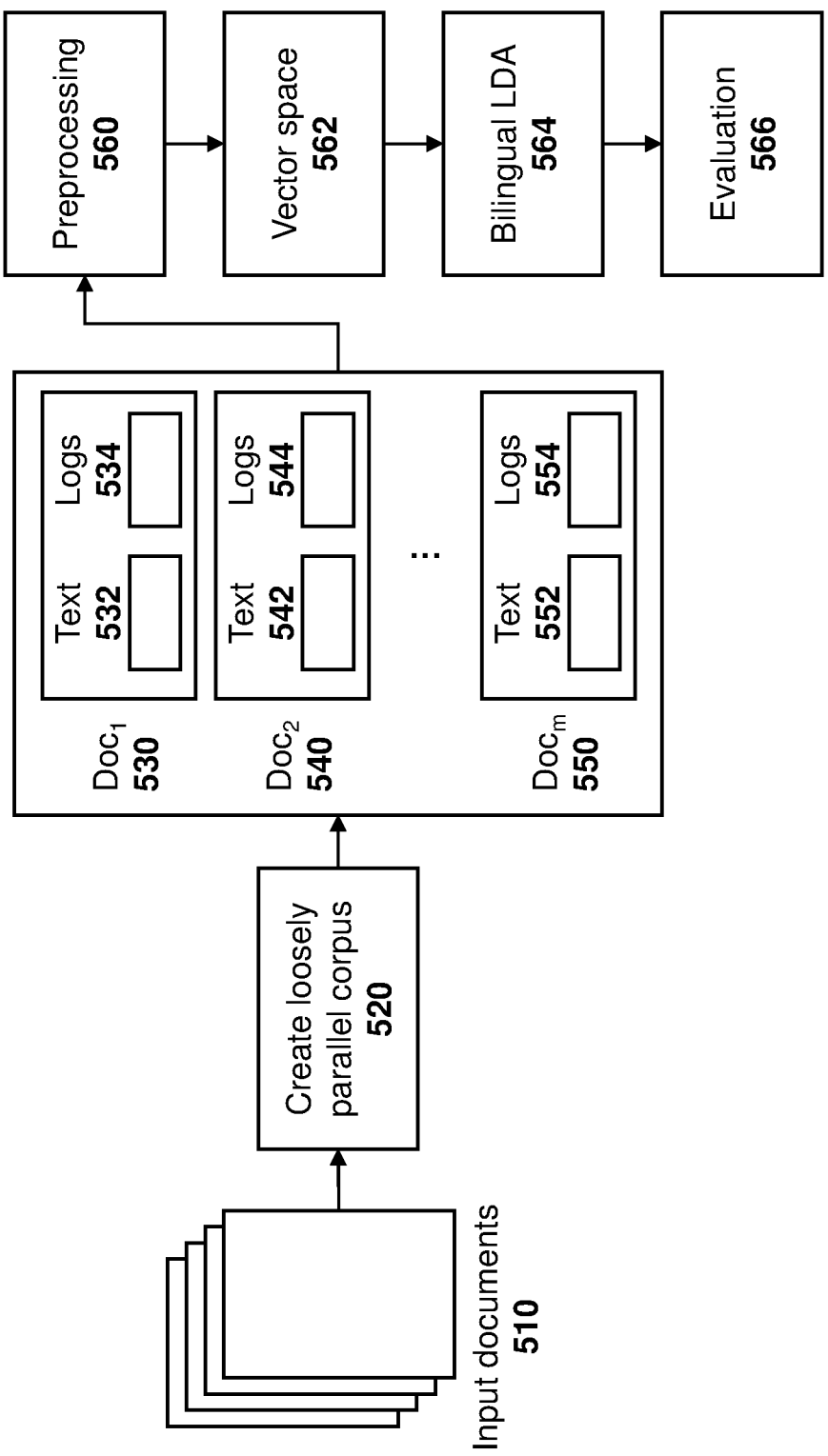
FIG. 5 is a block diagram showing the use of a Mallet model on a corpus of documents having both natural language and computer language terms.

In this regard, in a further embodiment of the present disclosure, an existing bilingual candidate model is adapted for computer language text. Reference is now made to FIG. 5.

In particular, the embodiment of FIG. 5 uses Mallet's multilingual LDA implementation, as for example published by GitHub with the title "Mallet: Machine Learning for Language Toolkit". This implementation uses the pLDA, also known as the pLTM, algorithm, which may be suitable for loosely parallel corpora. Loosely parallel corpora can be formalized as a set of document pairs $(d_1, d_2)$, where $d_1$ and $d_2$ are each written in a different language, yet they share similar content. In other words, Mallet's implementation does not require $d_1$ and $d_2$ to be direct translations of one another. In this regard, in the embodiment of FIG. 5, a model for use with natural language in computer language uses Mallet's multilingual LDA implementation. The input to this model is the loosely parallel corpora, which is built by extracting natural language text and computer language text parts of each document.

Thus, in the embodiment of FIG. 5, input documents 510 are used to create a loosely parallel corpus 520 which is shown having a plurality of documents. In particular common document 530 includes a text (natural language) portion 532 and a logs (computer language) portion 534. Document 540 includes a text (natural language) portion 542 and a logs (computer language) portion 544. This continues for all the documents within the input documents 510 and leads to document 550 including a text (natural language) portion 552 and a log (computer language) portion 554.

In some cases mapping may occur to create the computer language and natural language portions.

The output from the loosely parallel corpus 520 is then provided to a standard LDA model. In particular, preprocessing occurs at block 560 and could be similar to the preprocessing done at block 130 in FIG. 1.

Vector spaces may be created at block 562, which may be done in a similar manner to the creation of vector spaces at block 140 in FIG. 1.

A bilingual LDA then is processed at block 564 with the division of the text and logs.

An evaluation may then occur at block 566. The evaluation at block 566 may be similar to the evaluation performed at block 160 in FIG. 1.

Thus, the embodiment of FIG. 5 may prioritize text and log alignment and provides a straightforward solution. Further, as only a single LDA is used, this may provide a lower computation cost when compared to the embodiment of FIG. 4. However, in some cases text and logs may not align, which can result in fewer discovered topics and/or less coherent topics in some cases.

Quality

LDA models need to produce a coherent set of topics. In other words, the LDA model needs to produce a set of words describing a topic that is semantically connected. In this regard, a topic coherence metric may be used to determine the degree of semantic similarity between high scoring words in a topic.

A further evaluation of quality may be the level of inferential power achieved by the candidate model. Specifically, LDA models are useful when they can correctly guess one or more of the higher weighted topics of a new, unseen document. Specifically, in LDA each document will typically have a probability or weighting for the topics in the corpus associated with that document, and the higher probability or weighting scores for topics in the document will be indicative of the topics of the document. In one case a document having "mostly" topic 1 (of say, ten topics in the corpus) might have a topic assignment of (t1: 90%, t2: 8%, t2: 1.9%, t4 . . . t10: less than 0.1%). Thus the level of inferential power can be based on whether the model can correctly guess the one or more most highly weighted topics. Therefore, equality metric may be a "perplexity" score, where the model can be evaluated on how perplexed it becomes when it encounters words of a new, unseen document.

A further evaluation of quality maybe the text-log (natural-computer language) alignment achieved by the candidate models. In particular, LDA maybe used to produce topics that contain both natural language words and computer language words. In this regard, a quality metric may include the level of alignment.

Hyperparameter tuning, for example using the techniques described by J. Ansel et al, "An extensible framework for pro-gram autotuning", proceedings of the 23rd International Conference on Parallel Architectures and Compilation, PACT '14, Association for Computing Machinery, New York, NY, USA, 2014, p. 303-316 may be used to tune the LDA models.

Utilizing the above evaluation criteria, the embodiments of FIGS. 3, 4 and 5 were evaluated with a particular corpus of documents. The embodiments of FIGS. 3 and 4 achieved very high coherence and the embodiment of FIG. 5 achieved a low to medium coherence.

Further, with regards to perplexity, the embodiment of FIG. 4 achieved the lowest perplexity, and thus the highest inferential power. However, the embodiment of FIG. 4 produced a coarser grain view of the themes discussed in the documents, since it produced fewer topics than the models of FIGS. 3 and 5.

Comparing the embodiments of FIGS. 3 and 5 found that the embodiment of FIG. 3 produced topics with higher coherence, while the embodiment of FIG. 5 produced topics with lower perplexity.

Each was able to align natural language and computer language terms in a corpus of documents and any could be used as practical implementations for linking such loosely associated terms.

Therefore, the embodiments of the present disclosure provide for the linking natural language (e.g., English) to computer language (e.g., system logs). This may be applied to technical support threads in some cases.

Uncovering such links may enable the construction of a knowledge base that connects technical problem discussions to log or computer language excerpts that are often associated alongside those discussions.

Various embodiments of LDA models used to create such links are therefore provided.

The above models may be implemented using any computing device or combination of computing devices. One simplified diagram of a computing device is shown with regard to FIG. 6. The computing device of FIG. 6 could be any fixed or mobile computing device.

Figure 6:
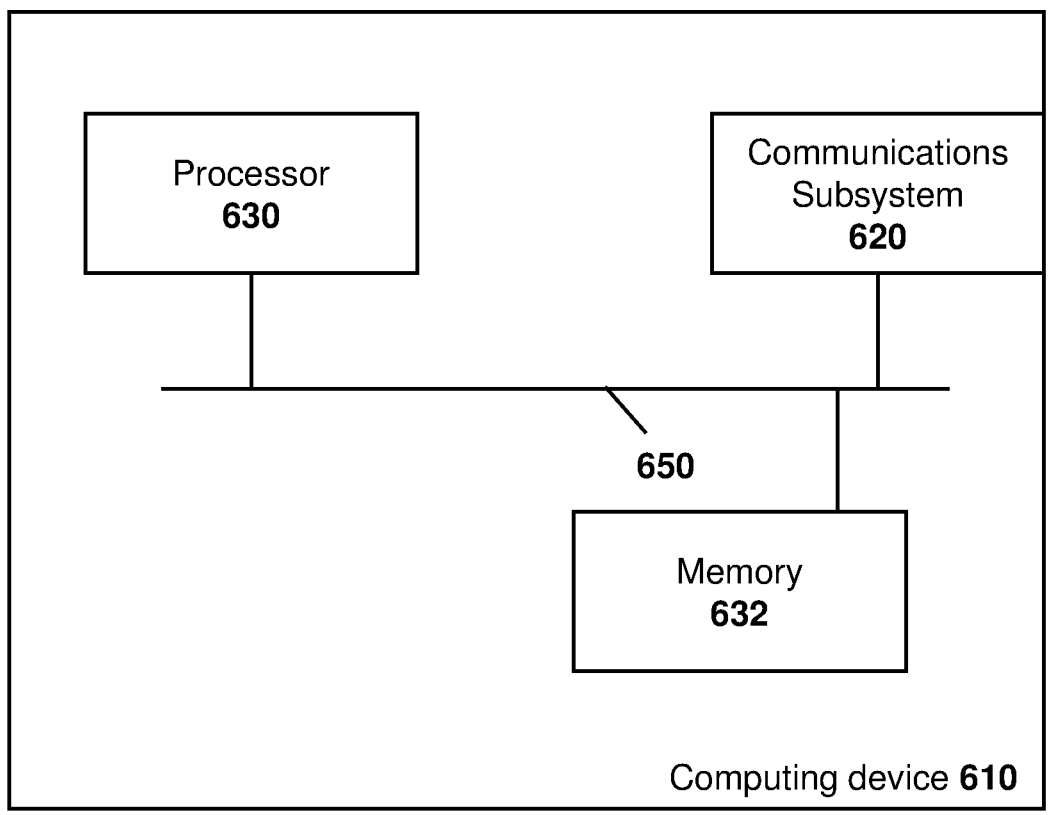
FIG. 6 is a block diagram of a simplified computing device capable of being used with the embodiments of the present disclosure.

In FIG. 6, device 610 includes a processor 620 and a communications subsystem 630, where the processor 620 and communications subsystem 630 cooperate to perform the methods of the embodiments described above. Communications subsystem 630 allows device 610 to communicate with other devices or network elements and may vary based on the type of communication being performed. Further, communications subsystem 630 may comprise a plurality of communications technologies, including any wired or wireless communications technology.

Processor 620 is configured to execute programmable logic, which may be stored, along with data, on device 610, and shown in the example of FIG. 6 as memory 632. Memory 632 can be any tangible, non-transitory computer readable storage medium which stores instruction code that, when executed by processor 620 cause device 610 to perform the methods of the present disclosure. The computer readable storage medium may be a tangible or in transitory/non-transitory medium such as optical (e.g., CD, DVD, etc.), magnetic (e.g., tape), flash drive, hard drive, or other memory known in the art.

Alternatively, or in addition to memory 632, device 610 may access data or programmable logic from an external storage medium, for example through communications subsystem 630.

Communications between the various elements of device 610 may be through an internal bus 650 in one embodiment. However, other forms of communication are possible.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems, or methods with insubstantial differences from the techniques of this application as described herein.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation described above should not be understood as requiring such separation in all implementations, and it should be understood that the described program components and systems can generally be integrated together in a single software product or packaged into multiple software products.

Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps are not implied by the order they appear in the claims.

When messages are sent to/from an electronic device, such operations may not be immediate or from the server directly. They may be synchronously or asynchronously delivered, from a server or other computing system infrastructure supporting the devices/methods/systems described herein. The foregoing steps may include, in whole or in part, synchronous/asynchronous communications to/from the device/infrastructure. Moreover, communication from the electronic device may be to one or more endpoints on a network. These endpoints may be serviced by a server, a distributed computing system, a stream processor, etc. Content Delivery Networks (CDNs) may also provide may provide communication to an electronic device. For example, rather than a typical server response, the server may also provision or indicate a data for content delivery network (CDN) to await download by the electronic device at a later time, such as a subsequent activity of electronic device. Thus, data may be sent directly from the server, or other infrastructure, such as a distributed infrastructure, or a CDN, as part of or separate from the system.

Typically, storage mediums can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly a plurality of nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

The invention claimed is:

1. A method at a computing device comprising:
mapping, within a corpus of documents comprising a plurality of terms, each term of the plurality of terms as a natural language term or a computer language term, thereby creating mapped terms;
applying a first Latent Dirichlet Allocation (LDA) model only to the natural language terms to create a first set of topics;
applying a second LDA model only to the computer language terms to create a second set of topics;
creating a document summary by combining the first set of topics and the second set of topics;
adding the document summary to the corpus of documents, thereby creating a corpus with topics; and
applying a third LDA model to the corpus with topics;
wherein the mapping utilizes a section break between the natural language terms and the computer language terms, the section break comprising standardized text at a beginning or an end of a section having computer language therein.

2. The method of claim 1, wherein the mapping comprises adding a prefix to each term, the prefix being different for natural language terms than for computer language terms.

3. The method of claim 1, wherein the creating the document summary extracts a defined number of terms from the plurality of terms having a highest term probability.

4. The method of claim 1, wherein the creating the document summary further comprises appending topic indexes at the end of each term of the plurality of terms.

5. The method of claim 1, wherein the corpus of documents is limited to documents having a single computer language.

6. The method of claim 1, further comprising applying hyperparameter tuning to the at least one of the first LDA model or the second LDA model.

7. The method of claim 1, further comprising, preprocessing the corpus of documents, said preprocessing comprising at least one of tokenization, lemmatization, stemming, and removal of stop words.

8. A computing device comprising:
a processor; and
a communications subsystem,
wherein the computing device is configured to:
map, within a corpus of documents comprising a plurality of terms, each term of the plurality of terms as a natural language term or a computer language term, thereby creating mapped terms;
apply a first Latent Dirichlet Allocation (LDA) model only to the natural language terms to create a first set of topics;
apply a second LDA model only to the computer language terms to create a second set of topics;
create a document summary by combining the first set of topics and the second set of topics;
add the document summary to the corpus of documents, thereby creating a corpus with topics; and
apply a third LDA model to the corpus with topics;
wherein the mapping utilizes a section break between the natural language terms and the computer language terms, the section break comprising standardized text at a beginning or an end of a section having computer language therein.

9. The computing device of claim 8, wherein the computing device is configured to map by adding a prefix to each term, the prefix being different for natural language terms than for computer language terms.

10. The computing device of claim 8, wherein the computing device is configured to create the document summary by extracting a defined number of terms from the plurality of terms having a highest term probability.

11. The computing device of claim 8, wherein the computing device is configured to create the document summary by further appending topic indexes at the end of each term of the plurality of terms.

12. The computing device of claim 8, wherein the corpus of documents is limited to documents having a single computer language.

13. The computing device of claim 8, further comprising applying hyperparameter tuning to the at least one of the first LDA model or the second LDA model.

14. The computing device of claim 8, further configured to preprocess the corpus of documents, said preprocessing comprising at least one of tokenization, lemmatization, stemming, and removal of stop words.

15. A non-transitory computer-readable medium for storing instruction code, which, when executed by a processor of a computing device cause the computing device to:
map, within a corpus of documents comprising a plurality of terms, each term of the plurality of terms as a natural language term or a computer language term, thereby creating mapped terms;
apply a first Latent Dirichlet Allocation (LDA) model only to the natural language terms to create a first set of topics;
apply a second LDA model only to the computer language terms to create a second set of topics;
create a document summary by combining the first set of topics and the second set of topics;
add the document summary to the corpus of documents, thereby creating a corpus with topics; and
apply a third LDA model to the corpus with topics;

wherein the mapping utilizes a section break between the natural language terms and the computer language terms, the section break comprising standardized text at a beginning or an end of a section having computer language therein.

16. The non-transitory computer-readable medium of claim 15, wherein the instruction code causes the computing device to map by adding a prefix to each term, the prefix being different for natural language terms than for computer language terms.

17. The non-transitory computer-readable medium of claim 15, wherein the instruction code further causes the computing device to preprocess the corpus of documents, said preprocessing comprising at least one of tokenization, lemmatization, stemming, and removal of stop words.

* * * * *